UNITED STATES PATENT OFFICE 2,542,610

FRIEDEL-CRAFTS DOUBLE SALT CATALYST

David W. Young, Roselle, N. J., assignor to Standard Oil Development Company, a corporation of Delaware No Drawing. Application February 8, 1949, Serial No. 75,311

13 Claims. (Cl. 252—429)

This invention relates to polymerization catalysts of the Friedel-Crafts type, relates particularly to catalyst solutions suitable for low temperature polymerizations, alkylations and analogous reactions, and relates particularly to a hydrocarbon soluble Friedel-Crafts halide complex compound with oxygen which is of high potency in room temperatures and of high potency and good solubility at markedly reduced temperatures.

This application is a continuation-in-part of application Serial No. 471,077, filed January 1, 1943, now Patent 2,481,273.

It has been found possible to polymerize isobutylene, or isobutylene and diolefins in admixture at temperatures ranging from 0° C. down to approximately —160° C. by the application thereto of Friedel-Crafts catalysts such as boron trifluoride or aluminum chloride in solution. However, boron trifluoride as a catalyst is readily poisoned by impurities, and aluminum chloride, while it is soluble in a limited number of substances such as the lower alkyl halides, carbon disulfide and the like, has such a low solubility that only relatively low concentrations can be prepared, and in addition these solvents are relatively expensive and in some instances are undesirable in the olefinic material.

According to the present invention, Friedel-Crafts catalyst complexes, such as complexes of aluminum bromide with aluminyl bromide (AlOBr) are prepared and dissolved in hydrocarbon solvents such as liquid propane in which their solubility is relatively quite high. In such solutions, their catalytic potency is very high and they yield excellent olefinic polymers of very high molecular weights. In addition by proper control of the proportions of the normal salt and the aluminyl salt, it is possible to exercise a very substantial control of the speed of polymerization without sacrifice of the quality of the polymer.

Also, according to the present invention, the catalyst solution is useful for the preparation of complex cyclic ethers, for the preparation of substituted phenols, for the cyclicization of unsaturated polymers and for a wide range of other reactions.

Thus, an object of the invention is to dissolve Friedel-Crafts complexes in hydrocarbon solvents to yield catalyst liquids capable of polymerizing olefinic materials to high molecular weights, and for a wide range of other reactions.

Other objects and details of the invention will be apparent from the following description:

In practising the invention, a double salt is prepared of a Friedel-Crafts halide such as aluminum bromide with an oxy halide of a Friedel-Crafts metal such as titanium oxy chloride. Representative catalysts, according to the invention, are listed as follows:

| | |
|---|---|
| InOBr.AlBr₃ | TiOCl₂.AlBr₂I |
| TiOF₂.AlBr₃ | AlBr₃.AlOBr |
| TiOBr₂.AlBr₃ | AlBr₂Cl.AlOBr |
| TiBr₄.AlOBr | AlCl₃.AlOI |
| TiF₄.AlOBr | AlI₃.AlOBr |
| TiOCl₂.Al₂Br₅Cl | BBr₃.AlOBr |
| TiOCl₂.AlBr₃ | TiOCl₂.AlBr₃.AlI₃ |

In preparing these substances, a Friedel-Crafts oxy halide is prepared by treatment of the halide with small or limited amounts of cold water, then the oxy halide and a second halide are mixed and heated to fusion to yield a homogeneous double salt and to drive off the hydrogen halide produced. A convenient method for hydrating the chlorides is to mix the Friedel-Crafts metal halide with an inactive salt containing a substantial amount of water of crystalization. Magnesium sulfate with water of crystalization is a good material. The reactions involved are well shown by the following equations:

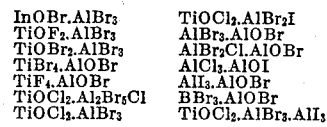

This yields a double salt of a Friedel-Crafts bromide with the oxy chloride of a second Friedel-Crafts metal. Alternatively a single Friedel-Crafts metal and halide may be used as in the following equations:

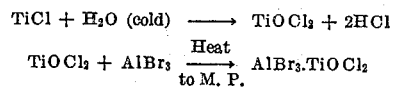

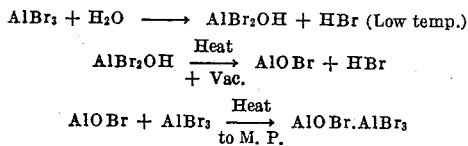

In either of these reactions, the Friedel-Crafts halide is mixed with the powdered salt hydrate at approximately 20° C. in as fine a state of division as possible and the mixture is allowed to stand for some hours. The resulting metal oxy halide may then be separated from the residuum of inert salt by treatment with a solvent such as a low boiling hydrocarbon or the like. Alternatively, however, the separation need not be effected, but the second portion of Friedel-Crafts halide may be added to the mixture of inert salt hydrate and Friedel-Crafts halide and the material heated under vacuum to the melting point of the double salt to drive off the hydrogen halide which is evolved by the partial hydration. Thereafter the double oxy halide and normal halide may be removed from the inert salt by treatment with a solvent such as a low boiling hydrocarbon.

These complex salts of Friedel-Crafts metals and halides show a relatively very high solubility in such solvents as liquid ethane, propane, butane, pentane, hexane, heptane, kerosene, benzene, toluene, chloroform, carbon disulfide, ether, alcohol and carbon sulfo chloride and the like. The solubility characteristics are well indicated by the solubility of the complex of aluminum bromide and aluminyl bromide $4(AlBr_3).(AlOBr)$ in normal butane which is found to be 9.7 grams per 100 milliliters at the boiling point of normal butane (approximately $0.60°$ C.); and 0.6 gram per 100 milliliters at $-78°$ C.

For the purposes of this invention, substantially any of the Friedel-Crafts catalyst substances as disclosed by N. O. Calloway in his article on the "Friedel Crafts Synthesis" printed in the issue of "Chemical Reviews" published for the American Chemical Society at Baltimore in 1935, in volume XVII, Number 3, the article beginning on page 327, the list being particularly well shown on page 325, may be used, and either one metal or two metals or more than two metals may be used, depending upon the particular catalyst characteristics desired. Likewise, a single halide may be used or several different halides may be used.

This type of catalyst is particularly desirable for olefinic polymerizations generally. It is particularly adapted to the low temperature polymerization of isobutylene, to yield high molecular weight polymers having molecular weights between 1000 and 500,000 (as determined by the Staudinger method). For this purpose the isobutylene or other olefin having from 2 to 20 carbon atoms per molecule is cooled either by an external refrigerant, around the polymerization reactor, or by an internal refrigerant such as admixed liquid ethylene or liquid ethane or liquid methane or liquid propane or the like, or a nondiluent refrigerant may be used such as solid carbon dioxide or liquid carbon dioxide dissolved in the reaction mixture; the amount present being sufficient to cool the material to the equilibrium boiling point of the mixture and maintain that temperature in spite of the heat of polymerization. From 100 parts of refrigerant per 100 parts of isobutylene to 700 to 800 parts of refrigerant per 100 parts of isoolefin is a convenient range. The resulting polymer may have a molecular weight within the range between 1000 and 500,000 and may have an iodine number within the range of a small fraction of 1 to about 10, the iodine number being inversely proportional to the molecular weight, and when molecular weights exceed about 10,000 the material is substantially saturated chemically and behaves practically as other fully saturated hydrocarbons alike.

The catalyst is effective in the polymerization of ethylene to yield a moderate to heavy oil, with propylene to yield a sticky semi-solid polymer; to isobutylene as above described; to normal butylene to yield a wide range of polymers from a medium oil to a practically solid polymer; to the various pentenes; to the various hexenes, heptenes, octenes, nonenes, decenes, andecenes, duodecenes, and the other mono-olefins having 13, 14, 15, etc. to at least 20 carbon atoms per molecule. As far as the present invention is concerned, the reaction is definitely effective with mono-olefins having as many as 20 carbon atoms, and incidental evidence indicates that the reaction is a general one with no limitation upon the carbon atom number.

Alternatively, the catalyst is valuable for the polymerization of olefinic mixtures such as mixtures of an isoolefin, preferably isobutylene with a diolefin such as butadiene or other diolefin having from 4 to 14 carbon atoms per molecule. Such a polymerization mixture preferably contains a major proportion of the isoolefin and a minor proportion of the diolefin, although valuable and worthwhile products are obtained from any proportion having above 5 or 10% of the isoolefin present. The catalyst is not limited to the polymerization of isoolefins or isoolefin-containing mixtures, nor is it limited to low temperature polymerizations since it is applicable to many other polymerizable substances such as styrene, alpha methyl styrene, butadiene, isoprene, chloroprene and benzyl chloride.

In the polymerization of these materials, the catalyst solution is prepared containing from 0.05% of the double salt above described to saturation values which may range up to 15% or even higher, depending upon the solvent and the double salt. When working with the catalyst in solution form, the amount of catalyst solution used may vary from 0.1 part per 100 parts of polymerizable olefins to approximately 75 parts per 100 parts of polymerizable olefins, depending upon the temperature, the concentration of the catalyst solution and the nature of the polymerizable olefin. However, as these catalysts are hydrocarbon soluble, we do not wish to be limited to the use of these materials in solution form, as tests have proven that valuable polymers can be produced when traces of the solid powdered catalyst are added directly to a hydrocarbon monomer at temperatures from about $+100°$ to $-160°$.

EXAMPLE I

A mixture was prepared consisting of 100 parts of liquid isobutylene with 50 parts of liquid ethane and the container was chilled in a bath of liquid ethane to approximately $-86°$ C. Simultaneously, a catalyst was prepared as above described in the form of a double salt of aluminyl iodide with aluminum iodo bromide $(AlBr_2I)_2.AlOI$ dissolved in liquid propane, the solution containing approximately 1.7 percent of the solid catalyst. The polymerization reaction occurred within a time of a few seconds and a polyisobutylene having a molecular weight of approximately 22,000 was obtained, approximately 80% of the isobutylene being polymerized.

The catalyst used above was prepared by pulverizing one gram molecular weight of aluminum metal to a powder sufficiently small to pass through a ten mesh sieve. This pulverized metal was introduced into a dried vitreous reactor (such as is described by Archibald in his text on "The Preparation of Pure Inorganic Substances," page 164-171, published by John Wiley and Sons in 1932). The reactor and contents were then thoroughly dried by heating in a current of dry nitrogen prepared by passing the nitrogen through a drying system containing phosphorous pentoxide and strong sulfuric acid. When the system was dried and while still filled with dry nitrogen, the current of nitrogen was interrupted and one gram atomic weight of dry iodine was added at room temperature to the pulverized aluminum. Reaction began in a few seconds and the temperature of the mixture rose to about $80°$ C. At this stage 2 gram atomic weights of pure liquid bromine were introduced. The dry halogen reacted with the aluminum rapidly at about $80°$ and the temperature rose to about 200° C. Because of the high heat of reaction, the temperature was regulated by cooling water on the exterior of the reactor to prevent too violent combustion. As the reaction passed towards completion, the heat moderated, and the reactor was then held for several hours at about 80° C. Analysis of the finished material indicated that it was pure aluminum bromo iodide, $AlBr_2I$.

Simultaneously, aluminyl iodide was prepared by reacting a similar quantity of one gram molecular weight of powdered aluminum with 3 gram molecular weights of pure iodine (as outlined in Archibald's text "The Preparation of Pure Inorganic Substances," page 164–171). One molecular weight of aluminum tri-iodide was then treated for 24 hours at room temperature with one molecular weight of water obtained from the water of crystallization of crystallized magnesium sulfate, $MgSO_4.7H_2O$. The aluminyl iodide was then separated from the magnesium sulfate by solution in normal butane. The butane was then boiled off and the aluminyl bromide heated under vacuum to a temperature between 80° and 90° C. for about an hour, the vacuum being approximately 50 millimeters of mercury, to remove the hydrogen iodide. The following reactions occurred:

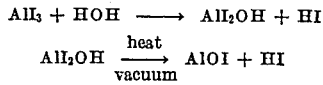

$$AlI_3 + HOH \longrightarrow AlI_2OH + HI$$
$$AlI_2OH \xrightarrow[\text{vacuum}]{\text{heat}} AlOI + HI$$

The aluminum bromo iodide and the aluminyl iodide were then mixed in powdered form in the ratio of 2 molecular weights of aluminum bromo iodide with one molecular weight of aluminyl iodide and heated to 102° C. for five minutes. The mixture fused to yield the desired double salt which upon analysis was found to contain the following components:

10.15% Al
47.60% I
39.90% Br
2.02% O
0.00% H

EXAMPLE II

A mixture was prepared consisting of 100 parts of isobutylene with 25 parts of liquid ethane and the reactor was placed in a bath of liquid ethane, the temperature being reduced thereby to approximately −86° C. Simultaneously a catalyst was prepared in the form of a double salt of aluminyl bromide with aluminum bromide (4AlBr₃.AlOBr)

by a procedure closely analogous to that described in Example I. Analysis of the finished double salt showed the composition to be as follows:

11.36% Al
87.40% Br
1.29% O
0.00% H

Approximately 0.2 part of this aluminyl double salt was dissolved in approximately 10 parts of liquid ethane and the solution was added to the cold isobutylene-containing mixture. The reaction occurred within a fraction of a second to yield a polyisobutylene having a molecular weight of approximately 58,000.

EXAMPLE III

A mixture was prepared consisting of approximately 100 parts of liquid isobutylene with 25 parts of liquid ethane and the container was chilled in a bath of liquid ethane to a temperature of approximately −86° C. Simultaneously a catalyst was prepared by the procedure as above outlined in the form of a double salt of aluminum bromide with titanyl chloride (4AlBr₃.TiOCl₂)

Approximately 0.2 part of this double salt was dissolved in approximately 10 parts of a 1 to 1 mixture of liquid ethane and liquid propane. The catalyst solution was then added to the cold isobutylene mixture and a polymerization reaction occurred within a fraction of a second to yield a polyisobutylene having a molecular weight of approximately 86,000.

EXAMPLE IV

A mixture of 100 parts of isobutylene with 50 parts of liquid ethane was prepared in a reactor and chilled by a surrounding jacket of liquid ethane to a temperature of approximately −86° C. Simultaneously a double salt catalyst of aluminyl bromide and aluminum bromide (4AlBr₃.AlOBr)

was prepared and approximately 0.2 part of the solid double salt was dissolved in approximately 10 parts of liquid butane. This solution was then added to the cold isobutylene mixture and a polymerization reaction occurred within a fraction of a second to yield a solid, polyisobutylene having a molecular weight of approximately 100,000. The finished polymer amounted to approximately 92% by weight of the amount of isobutylene monomer used. Upon analysis this double salt was found to contain the following components in the proportions indicated:

10.8% Al
87.9% Br
1.4% O

EXAMPLE V

A mixture was prepared consisting of 98 parts of isobutylene with two parts of isoprene and cooled to approximately −78° C. by the addition of powdered solid carbon dioxide to the olefinic mixture. This mixture was polymerized by the addition thereto of approximately 20 parts of a catalyst solution consisting of petroleum ether containing approximately 0.2 part per hundred of a double salt of aluminum bromide and aluminyl bromide (AlBr₃.AlOBr). A polymerization reaction occurred to yield an interpolymer of isobutylene and isoprene having a molecular weight of approximately 25,000. The yield of product was 54% by weight. This material was found to be reactive with sulfur and other curing agents to yield a good natural rubber substitute.

EXAMPLE VI

A series of polymers was prepared utilizing mixtures of isobutylene and isoprene in proportions ranging from 1.45% to 10% of isoprene in the mixture. These mixtures were cooled by an excess of solid carbon dioxide to a temperature of approximately −78° C. Simultaneously, a catalyst was prepared consisting of approximately 1 part of AlOBr with four parts aluminum bromide (4AlBr₃.AlOBr) dissolved in butane at the boiling point of butane. The concentration of the catalyst in the butane was 1%. Each of the cold mixtures of isobutylene and isoprene were then polymerized by adding approximately 20 parts of catalyst solution per 100 parts of mixed olefins. The catalyst solution was blown through a small nozzle delivering the catalyst onto the surface of the rapidly stirred olefinic mixture. In these instances the reaction did not start immediately but required from 1 to 5 minutes before it occurred, and continued for time intervals ranging from 30 to 40 minutes. At the close of the polymerization reaction, the reactor contents were dumped into warm water and the solid polymer recovered and dried. The several batches of polymer were then compounded on the open roll mill according to the following recipe:

|  | Parts |
|---|---|
| Polymer | 100 |
| Zinc oxide | 5 |
| Stearic acid | 3 |
| Sulfur | 2 |
| Cabot #9 | 50 |
| Tuads | 1 |
| Captax | 0.5 |

The following table shows the character of curing treatment applied to the compounded polymer and the physical properties of the resulting cured polymer:

*Tensile test data*

| Run No | 1 | 2 | 3 | 4 | | | | | |
|---|---|---|---|---|---|---|---|---|---|
| Isoprene Content% | 1.45 | 3 | 5 | 10 | | | | | |
| Cure (Min.) | 40 | 60 | 30 | 60 | 30 | 60 | 10 | 30 | 60 |
| Cure (°F.) | 307 | 307 | 307 | 307 | 307 | 307 | 307 | 307 | 307 |
| Modulus @ 300% | 775 | 919 | 663 | 1,112 | - | - | 275 | 592 | 670 |
| Tensile | 2,830 | 2,527 | 2,090 | 2,250 | 507 | 313 | 422 | 706 | 793 |
| Elongation | 697 | 697 | 700 | 550 | 709 | 948 | 484 | 380 | 320 |

*Flexometer data*

| Run No | 1 | 2 |
|---|---|---|
| Type of Polymer | B1.45 | B3 |
| Stroke (in.) | .125 | .125 |
| Load (lbs./sq. in.) | 148 | 148 |
| Oven Temp. °C | 100 | 100 |
| Static Compression | 386 | 348 |
| Initial Dynamic Compression | 334 | 283 |
| Time of Run (Min.) | 30 | 30 |
| Dynamic Drift | .146 | .144 |
| Temp. Rise (°C.) | 24.2 | 15.8 |
| Appearance | #2 | #4 |
| Cure (°F.) | 307 | 307 |

*Plasticity data and molecular weight*

| Run No | 1 | 2 | 3 | 4 |
|---|---|---|---|---|
| Polymer Type | B1.45 | B3 | B5 | B10 |
| Mooney Plast. (212° F.) | 77 | 25 | | |
| Rebound at R. T. (Per Cent) | 23.4 | | | |
| Williams Plast. (70° F.) | | | 30-6 | 33-5 |
| Molecular Weight | 46,000 | 56,000 | 40,000 | 21,000 |

These results show that a high grade interpolymer was obtained which is an adequate and satisfactory substitute for natural rubber.

EXAMPLE VII

A series of polymers was prepared utilizing mixtures of isobutylene and butadiene in proportions ranging from 3.5% to 5.0% of butadiene in the mixture. These mixtures were cooled by an excess of solid carbon dioxide to the temperature of approximately −78° C. Simultaneously, a catalyst was prepared consisting of $6AlBr_3 \cdot AlOBr$ The analysis of the catalyst is listed:

|  | Per cent |
|---|---|
| Al | 10.6 |
| Br | 88.5 |
| O | 0.9 |
| H | 0.0 |

Each of the cold mixtures of isobutylene and butadiene was polymerized by adding approximately 25 parts of catalyst solution. The solvent for the catalyst was propane and the concentration of the catalyst in propane was 2.1%. The catalyst solution was blown through a small nozzle delivering the catalyst onto the surface of the rapidly stirred olefinic mixture. After 10 minutes the yield of product was 80 to 90% by weight. The products were washed with water and compounded according to the recipe given in Example VI. The following table shows the character of compounded and cured products:

*Tensile test data*

| Run | 1 | 2 |
|---|---|---|
| Butadiene Content of Feed, percent | 3.5 | 5 |
| Cure, Min | 60 | 60 |
| Cure, °F | 700 | 307 |
| Modulus @ 300% | 113 | 685 |
| Tensile | 1,975 | 2,340 |
| Elongation | 900 | 650 |

EXAMPLE VIII

It is found that the proportions of the aluminyl compound to the aluminum compound (or other Friedel-Crafts normal and oxide salt) greatly modified the speed at which the polymerization reaction is caused to occur. A mixture was prepared consisting of 97 parts by weight of isobutylene with 3 parts by weight of isoprene which was cooled to a temperature of approximately −78° C. by an excess of solid carbon dioxide. A series of double salt catalysts was prepared as described in Example I with varying proportions of aluminum bromide and aluminyl bromide. The various salts were found to polymerize the olefinic mixture at different speeds as shown in the following table:

| Catalyst Composition | Polymerization Time | Per cent Yield | Remarks |
|---|---|---|---|
| AlOBr | | | Does not polymerize. |
| AlOBr.AlBr$_3$ | 5 hours | 25 | Very slow reaction. |
| AlOBr.2AlBr$_3$ | 3 hours | 60 | Slightly faster polymerization. |
| AlOBr.3AlBr$_3$ | 2 hours | 80 | Faster polymerization. |
| AlOBr.4AlBr$_3$ | 1 hour | 86 | Moderately rapid polymerization rate. |
| AlOBr.6AlBr$_3$ | ½ hour | 90 | Good polymerization rate. |
| AlBr$_3$ | 10 minutes | 90 | Forms only low molecular weight polymers. |

In the above table, all of the polymers except those produced by aluminum bromide alone have molecular weights well above 25,000 (as determined by the Staudinger method) and the table shows the advantageous control of the speed of reaction obtainable by control of this catalyst. This control is particularly desirable for the polymerization of large quantities of olefinic mixtures in reactors having merely an exterior cooling jacket, since a relatively slow rate of refrigeration will maintain the polymerization temperature at the desired low value, thereby avoiding the necessity of extremely rapid circulation or circulation through cooling tubes which is necessary with all of the prior catalysts which produce ultra high speed polymerization reactions. This characteristic is particularly convenient since it avoids the difficulties otherwise encountered by complicated cooling and circulating equipment.

EXAMPLE IX

A mixture was prepared consisting of 500 parts by weight of vinyl isobutyl-ether and 1300 parts of liquid ethane, in a thermally insulated container. The mixture was stirred vigorously and during stirring there was added slowly 25 parts by weight of a solution of the double salt of aluminum bromide with aluminum oxy bromide having the formula $(AlBr_3)_4(AlOBr)$ in solution in liquid butane in the proportion of 0.30 part by weight of the aluminum salt per 100 parts by weight of butane. The polymerization started promptly upon the beginning of the addition of the catalyst solution and when a major portion of the unsaturate had polymerized, the addition of catalyst was discontinued after the addition of the 25 parts by weight.

When the polymerization was concluded, the mixture was poured into warm water to form a slurry of polymer in water which was then washed by stirring vigorously with further portions of water containing substantial amounts of isopropyl alcohol (although any other mono or poly alcohol could have been used), the material was then strained out of the water solution and dried with a yield of 440 parts by weight, amounting to 88% of the original unsaturate.

The polymer was found to be readily soluble in mineral oil and in hydrocarbons generally. In a light mineral lubricating oil it markedly improved the viscosity index and the presence of oxygen in the polymer molecule, derived from the original ether, imparts valuable extreme pressure properties to the lubricating oil solution of the polymer.

This reaction is particularly advantageous because of the high yield and the freedom from undesired and troublesome side reactions.

EXAMPLE X

A solution was prepared consisting of 500 parts by weight of styrene in 2,000 parts by weight of liquid methyl chloride. This mixture was then cooled to approximately −103° C. (below −90° C. and probably below −98° C.) by the application to the mixture of a refrigerating jacket filled with liquid ethylene. During the cooling, 500 parts by weight of isobutylene were added to the solution of styrene in methyl chloride. This material at a temperature nearly down to −103° C., was well stirred and a catalyst solution consisting of 0.26 part by weight of the complex of 4 molecule weights of aluminum bromide with one molecule weight of aluminum oxy bromide $(AlBr_3)_4(AlOBr)$ per 100 parts by weight of propane was added slowly until an amount of 312 parts of solution by weight had been added.

This amount of catalyst required approximately 23 minutes for addition. The reaction began promptly upon starting the addition of the catalyst solution, and the amount added was sufficient to polymerize nearly all of the styrene and isobutylene. When the catalyst solution had been added, the stirring was continued for a short time to make sure that the reaction was complete, and then the reaction mixture was poured into warm water to volatilize out the methyl chloride and any residual isobutylene, and warm up the polymer.

This procedure yielded a water slurry of solid polymer which was well washed with further portions of water and with water containing isopropyl alcohol to inactivate the catalyst. The solid polymer was then strained out from the water slurry and dried at a temperature between 50° C. and 60° C., in a vacuum dryer under about 24 inches of vacuum. The drying was complete in a little under 5 hours. There was obtained from the reaction a yield of 89.5% solid polymer upon the total amount of styrene and isobutylene used. The product was found to have a relatively high molecular weight, indicated by an intrinsic viscosity of 0.88 (Staudinger molecular weight number of 55,000).

EXAMPLE XI

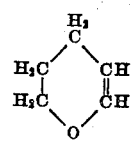

Dihydropyran in an amount of 168.2 parts by weight was placed in a convenient container and cooled to about 0° C. To the cold liquid there was then added an amount of approximately 62 parts by weight of ethylene glycol, these proportions being in a molecular weight ratio of 2 to 1. To this cold mixture there was then added a strong solution of aluminum bromide-aluminum oxy bromide catalyst in solution in liquid pentane, in the proportion of approximately 0.8 part by weight of the complex salt per 5 parts by weight of liquid pentane.

The reaction began with some promptness and continued slowly over about four hours, during which time the mixture warmed up to a temperature between 25° C. and 30° C. At the end of this time when the reaction appeared to be complete, the reaction mixture was poured into water to wash out the catalyst. The reaction product was a light, limpid, slightly yellow water-soluble liquid. The last of the water was decanted and the product dissolved in ether and dried over calcium chloride for five hours. The ether was then volatilized away from the material by heating on a steam plate after the addition of about 0.3 part by weight of caustic potash. (The caustic is necessary as a stabilizer for the product.)

The resulting product was found to have the following structure:

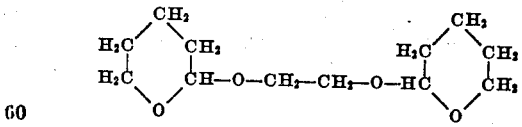

This compound is identified as di-2-tetrahydropyryl glycol ether, and the yield, based on the starting weight of the dihydropyran and the ethylene glycol was found to be 98%.

It may be noted that this reaction is a very smooth and easy one with no troublesome side reactions, no by-products, and a phenomenally high yield which appears to be characteristic of the reaction.

It may be noted that this catalyst, while a potent one, gives a moderate speed of reaction, resulting in a much slower evolution of heat and a much slower reaction temperature, which accounts for the high yield and low amounts of side reactions and by-products.

Furthermore, the reaction is found to be a general one and any mono or poly alcohol will add to the di-hydropyran compound, the reaction is particularly effective with ethylene glycol as above outlined. It is also effective with propylene glycol, with butylene glycol, with the 5 carbon, 6 carbon, 7 carbon, etc., glycols to at least 20 carbon atom glycols, without regard to the positions of the hydroxy groups. It is equally satisfactory with the mono alcohols having from 1 to 20 carbon atoms per molecule and the like.

The resulting products are suitable for a wide range of uses such as plasticizers in many different polymers, both rubbery and hard, and having a wide range of other uses which are obvious to those skilled in the art.

EXAMPLE XII

Dihydropyran, in an amount of 84.1 parts by weight was placed in a container and cooled to about 0° C., and to the cold liquid there was then added an amount of approximately 45 parts by weight of 1-3 propylene glycol. To this cold mixture there was then added 5 parts by weight of a $\frac{1}{10}$% solution of the aluminum bromide-aluminum oxy bromide catalyst in liquid butane. The reaction began promptly and was allowed to continue for 15 minutes at the end of which time, the temperature had risen only slightly, but the reaction appeared to be complete. The cold mixture was then poured into warm water and washed several times with a water solution of soda bicarbonate. The pale yellow oil resulting, was separated from the water solution and dried over calcium chloride. The compound is identified as di-2-tetrahydropyran propyl ether, and it is, in general, quite similar in its characteristics and uses to the previously described compound. Again the high potency of the catalyst and its low reaction rate avoids the unduly high temperatures and troublesome by-products inherent in other methods of producing such compounds.

In Examples XI and XII the catalyst was used in solution form, under which conditions it is particularly valuable. However, the relatively slow rate of reaction and the fact that a liquid product is produced, permits of the use of the reaction mixture itself as solvent, and the aluminum bromide-aluminyl bromide complex may be added in solid form directly to the reaction mixture, under which circumstances it dissolves promptly in the reaction mixture to yield a catalyst solution which is equally effective.

It should be noted that in any reaction where this catalyst is used, if there is present a substantial amount of some hydrocarbon, whether reactive or nonreactive, and the reaction is to proceed only to a liquid product, the reaction mixture itself may serve as solvent. When, however, the reaction is a rapid one and especially if it goes to a solid product, the reactant mixture cannot be used as a homo-solvent, since the particles of catalyst tend to be coated with solid polymer and protected thereby from solution in the reaction mixture.

EXAMPLE XIII

A portion of phenol was cooled to a temperature within the range between +10° and +20° C. A catalytic amount of approximately 0.5% on the phenol of the aluminum bromide-aluminum oxy bromide catalyst was added and gaseous isobutylene was passed into the benzene solution of phenolic material. A prompt reaction occurred to yield a white crystalline product, having a melting point between 130° and 131° C. This material, upon study, was found to be insoluble in aqueous and alcoholic alkali solution, and was found to be 2,4,6-tri-t-butyl phenol. The yield obtained was approximately 90%, and the material was found to be of very high purity.

This material is well known as an oxidation inhibitor and has many other uses.

EXAMPLE XIV

A mixture was prepared consisting of 94 parts by weight of phenol with 372 parts by weight of tetrachlor-ethane, and 3.3 parts by weight of the aluminum bromide-aluminum oxy bromide catalyst was dissolved therein. To the clear solution, at 10° C., there were then slowly added 53 parts by weight of dry gaseous isobutylene. The addition was continued slowly over a time interval of approximately seven hours, at the end of which time the increase in weight indicated that the olefin had fully alkylated the phenol. The product was then washed with water containing 5% sodium bicarbonate, and dried. One portion of the mixture was then treated under vacuum to remove the tetrachlorethane and leave the solid residue of 2,4 6-tri-t-butyl phenol. Another portion of the solution was added directly to a light lubricating oil as an oxidation inhibitor, and still another portion of the solution was added directly to the isobutylene-diolefin copolymer known as "Butyl," as a breakdown inhibitor.

This reaction also is a general one in which any of the mono or poly olefins can be used to alkylate phenol, up to at least 18 to 20 carbon atoms in the olefin, and the reaction is equally effective with such compounds as benzene, toluene, xylene, naphthalene, and the analogous compounds having other substituents. However, the temperatures required in these other reactions vary quite widely from 0° C. up to +100° C., the necessary temperature being determined by the molecular weight of the respective components, and also, to some extent, by the particular complex salt used.

EXAMPLE XV

A hard resin olefinic polymer was prepared by interaction of a mixture of 60% butadiene with 40% of the octene identified as "diisobutylene," at a temperature of approximately −10° C., by the application to the mixture of a solution of aluminum chloride in methyl chloride, as shown in the copending application of Garber, Young and Sparks, No. 604,350, filed July 11, 1945. The resulting resin in solution in the diluent was then washed with water, the diluent volatilized out and the resin recovered in coherent form. As so prepared, the resin showed an iodine number of 150 and a melting point of 75° C. (by the "ball and ring" method).

This material was dissolved in light naphtha and approximately 0.5% of solid aluminum bromide-aluminum oxy bromide complex was added and the material stirred until the catalyst was fully dissolved. The material was then heated to the boiling point of the naphtha for a time interval of approximately an hour, at the end of which time the solution was washed with water containing small amounts of soda bicarbonate, the light naphtha boiled off and the solid resin recovered. After this treatment it was found to have an iodine number (by Wijs method) of 80, and a melting point of 100° C.

This is a characteristic cyclization reaction which is particularly well carried out by the catalyst of the present invention, and is representative of a wide range of cyclization reactions.

The catalyst is also effective for a wide range of other polymerization reactions. It is particularly effective for the polymerization of styrene. The catalyst dissolves readily in styrene, and either at room temperature or under slightly elevated temperatures, the reaction proceeds rapidly to produce a high grade solid poly-styrene. This may be done with or without a solvent. If a clear styrene polymer is to be obtained, it is desirable to remove the spent catalyst which can be done by washing the polymerization solution, or by dissolving the solid polymer in an appropriate solvent, washing out the catalyst and then separating the solvent.

Similarly, the catalyst is efficient and effective for the production of polypropylene, from which it produces a tacky semi-solid. As before, the polymerization may be conducted on the liquified propylene as such, in which the catalyst is readily soluble, or it may be conducted by dissolving the catalyst in a convenient solvent which may be any of the fluid saturated hydrocarbons, and then adding the propylene, either in liquid form at low temperature, or under pressure, or by bubbling the gaseous propylene through the catalyst solution.

The reaction is also applicable to ethylene, and as before, the reaction may be conducted upon the cold liquid ethylene, in which the catalyst dissolves readily, and then produces the desired polymer, or the catalyst may be dissolved in a convenient aliphatic solvent and the ethylene passed in in gaseous form. This reaction with ethylene produces only oils, since the reaction does not go far enough to produce a solid polymer.

Similarly, the catalyst may be used to destroy the gum-forming properties of gasoline containing unsaturates. The addition of small amounts of the catalyst to the gasoline, polymerizes and throws down quite promptly all of the polymerizable unsaturates in gasoline, thereby greatly improving its storage life, preventing the development of gums during storage, and markedly improving the storage stability of the gasolines, as well as producing valuable polymers which can be put to many important uses.

Accordingly, the invention presents a new and useful polymer substance in the form of a solution of a complex Friedel-Crafts substance which is soluble in the lower hydrocarbon liquids at low temperature and in such solutions shows a powerful polymerizing effect upon liquid olefinic material at low temperature to yield high molecular weight polymers and interpolymers which are extremely valuable.

While there are above disclosed but a limited number of embodiments of the invention, it is possible to produce still other embodiments without departure from the inventive concept herein disclosed and it is therefore desired that only such limitations be imposed upon the appended claims as are stated therein or required by the prior art.

The invention claimed is:

1. A catalyst consisting essentially of a double salt of a Friedel-Crafts catalytically active metal halide with a Friedel-Crafts catalytically active metal oxy halide.

2. A catalyst solution consisting essentially of a double salt of a Friedel-Crafts catalytically active metal halide with a Friedel-Crafts catalytically active metal oxy halide in solution in a hydrocarbon solvent having less than 10 carbon atoms per molecule.

3. A polymerization catalyst consisting essentially of a double salt of an aluminum halide and an aluminyl halide.

4. A polymerization catalyst consisting essentially of a double salt of an aluminum halide and an aluminyl halide in solution in a hydrocarbon solvent having less than 10 carbon atoms per molecule.

5. A polymerization catalyst consisting essentially of a double salt of aluminum bromide and aluminyl bromide.

6. A polymerization catalyst consisting essentially of a double salt of aluminum bromide and aluminyl bromide in solution in a hydrocarbon liquid having less than 6 carbon atoms per molecule.

7. A polymerization catalyst consisting essentially of a double salt of aluminum bromide and aluminyl bromide in solution in an alkyl halide having less than 6 carbon atoms per molecule.

8. A catalyst solution consisting essentially of 0.05% to 15% by weight of a double salt of a Friedel-Crafts catalytically active metal halide with a Friedel-Crafts catalytically active metal oxy halide in solution in an organic solvent having less than 10 carbon atoms per molecule.

9. Composition according to claim 8 in which the organic solvent is selected from the group consisting of paraffinic hydrocarbons of 2 to 7 carbon atoms, and saturated paraffin hydrocarbon derivatives containing at least one element selected from the group consisting of halogen, oxygen and sulfur.

10. A catalyst consisting essentially of a double salt of 1 to 6 mols of a Friedel-Crafts catalytically active metal halide with 1 mol of a Friedel-Crafts catalytically active metal oxy halide.

11. A catalyst consisting essentially of a double salt of 2 to 4 mols of a Friedel-Crafts catalytically active metal halide with 1 mol of a Friedel-Crafts catalytically active metal oxy halide.

12. A catalyst consisting essentially of a double salt of 4 mols of aluminum bromide with 1 mol of aluminyl bromide.

13. A catalyst consisting essentially of 0.05% to 15% by weight of a double salt of 4 mols of aluminum bromide with 1 mol of aluminyl bromide in solution of a liquefied paraffin hydrocarbon having 3 to 5 carbon atoms.

DAVID W. YOUNG.

REFERENCES CITED

The following references are of record in the file of this patent:

UNITED STATES PATENTS

| Number | Name | Date |
|---|---|---|
| 2,408,187 | Atwell | Sept. 24, 1946 |
| 2,467,162 | Schutze | Apr. 12, 1949 |
| 2,471,525 | Hillyer et al. | May 31, 1949 |